United States Patent [19]

McCoy

[11] Patent Number: 4,568,556
[45] Date of Patent: Feb. 4, 1986

[54] MARGARINE PRODUCT AND PROCESS

[75] Inventor: Stephen A. McCoy, Villa Hills, Ky.

[73] Assignee: The Procter & Gamble Company, Cincinnati, Ohio

[21] Appl. No.: 615,368

[22] Filed: Jun. 1, 1984

Related U.S. Application Data

[63] Continuation-in-part of Ser. No. 507,403, Jun. 24, 1983, abandoned.

[51] Int. Cl.$^4$ .......................... A23D 3/00; A23D 3/02
[52] U.S. Cl. ..................................... 426/603; 426/604
[58] Field of Search ................................ 426/603, 604

[56] References Cited

U.S. PATENT DOCUMENTS

| | | |
|---|---|---|
| Re. 30,086 | 8/1979 | Carlile et al. |
| 285,878 | 10/1883 | Cochran |
| 625,478 | 5/1899 | Uhlenbrock |
| 1,024,009 | 4/1912 | Kronenberger |
| 1,507,426 | 9/1924 | Reynolds |
| 2,434,429 | 1/1948 | Nelson |
| 2,558,204 | 6/1951 | Wilson et al. |
| 2,611,707 | 9/1952 | Rourke et al. |
| 2,772,976 | 12/1956 | Schmidt et al. |
| 2,797,164 | 6/1957 | McGowan et al. |
| 2,973,269 | 2/1961 | Melnick |
| 3,019,110 | 1/1962 | Bevarly |
| 3,189,465 | 6/1965 | Oakley et al. |
| 3,407,075 | 10/1968 | Barker |
| 3,488,199 | 1/1970 | Gander et al. |
| 3,490,919 | 1/1970 | Moran |
| 3,889,011 | 6/1975 | Read |
| 4,055,679 | 10/1977 | Kattenberg et al. |
| 4,087,564 | 5/1978 | Poot et al. |
| 4,087,565 | 5/1978 | Ebskamp |
| 4,205,095 | 5/1980 | Pike et al. |
| 4,217,372 | 8/1980 | Ebskamp |
| 4,360,536 | 11/1982 | Keuning et al. |
| 4,366,181 | 12/1982 | Dijkshoorn et al. |
| 4,388,339 | 6/1983 | Lomneth et al. |
| 4,390,561 | 6/1983 | Blair et al. |
| 4,447,462 | 5/1984 | Tafuri et al. |

FOREIGN PATENT DOCUMENTS

| | | |
|---|---|---|
| 1492946 | of 1969 | Fed. Rep. of Germany |
| 650481 | of 1951 | United Kingdom |
| 716591 | of 1954 | United Kingdom |
| 765870 | of 1957 | United Kingdom |
| 827172 | of 1960 | United Kingdom |
| 1481694 | of 1977 | United Kingdom |
| 1542864 | of 1979 | United Kingdom |

OTHER PUBLICATIONS

Swern, D., "Bailey's Industrial Oil and Fat Products", Interscience Publ., N.Y., 3rd Ed., 1964, pp. 204-226 and pp. 331-352.
Chikany, B., "Crystallization Processes of Fats & Their Role in Margarine Production, Parts I, II & III", Olaj. Szappan, Kozmetika, vol. 30 (4), pp. 102-105 (1981), vol. 13, pp. 9-13 (1982), pp. 52-56 (1982).
Haighten, A. J., "Blending, Chilling, and Tempering of Margarines and Shortenings", J. Am. Oil Chemists' Soc., vol. 53, pp. 397-399 (Jun. 1976).
Wiedermann, L. H., "Margarine and Margarine Oil, Formulation and Control", J. Am. Oil Chem. Soc., vol. 55, pp. 823-829, Nov. (1978).

Primary Examiner—Robert Yoncoskie
Attorney, Agent, or Firm—Gary M. Sutter; Nancy S. Mayer; Richard C. Witte

[57] ABSTRACT

Emulsified spreads, such as margarines, are made from structural fats having double-peaked differential scanning calorimetry curves, one representing triglycerides crystallizing at temperatures of from about 77° F. (25° C.) to about 50° F. (10° C.) and a second representing triglycerides crystallizing at about 41° F. (5° C.) to about 14° F. (−10° C.). The process for forming such spreads involves (1) cooling an emulsion of the structural fat, a soft oil and an aqueous phase to a temperature at or below the nucleation of triglycerides crystallizing at the higher temperature range; (2) working the emulsion; (3) cooling the worked emulsion to the nucleation point of the triglycerides crystallizing at the lower temperature range; and (4) working the emulsion a second time.

23 Claims, 4 Drawing Figures

MARGARINE PRODUCT AND PROCESS

This is a continuation-in-part of the prior copending patent application Ser. No. 507,403, filed June 24, 1983, now abandoned.

TECHNICAL FIELD

The present invention relates to emulsified spreads such as margarines and a specific method for making these emulsified spreads.

BACKGROUND OF THE INVENTION

Emulsified fat spreads, especially margarines, provide many benefits which make such spreads highly desirable as butter substitutes. For instance, margarines are lower in cost than butter, while providing many of the same taste characteristics of butter. Additionally, margarines can be formulated to be lower in cholesterol than buffer, which is a benefit for the many individuals concerned with high-cholesterol diets. Margarines spread more easily than butter. However, margarines which are equal to or superior to butter in all physical attributes have not been made.

In the search to obtain margarines exhibiting the positive attributes of butter, i.e. good mouth texture, thermal stability and good spreadability, many economically desirable starting materials have been tried without success. For instance, palm oils have long been of interest for use as margarines because of their relatively low costs and preferred triglyceride compositions. Unfortunately, standard margarine processing techniques often result in a post-hardening effect which makes these palm-based margarine products very hard and brittle.

Single fractionated or "topped" palm oil fats have been used to formulate margarine products which do not exhibit the post-hardening phenomenon. U.S. Pat. No. 3,189,465 to Oakley et al, issued June 15, 1965, relates to a margarine wherein at least a major portion of the fat consists of one or more lower melting fractions of a semi-soft oil, e.g. palm oil. These lower melting fractions can be obtained by a single thermal fractionation in which the higher melting fraction containing the trisaturated glycerides is removed. These margarines, although better than margarines made from palm oil alone, do not exhibit thermal stability, and more importantly, are extremely brittle and hard to spread. Other such margarines are disclosed in U.S. Pat. No. 4,055,679 to Kattenberg et al., issued Oct. 25, 1977 (plastic fat suitable for margarines containing a palm-based fat such as palm olein co-randomized with fats such as soybean oil or safflower oil), and U.S. Pat. No. 4,087,564 to Poot et al., issued May 2, 1978 (olefin fraction obtained by single thermal fractionation of co-randomized blend of palm oil and soybean oil).

Mid-palm oil fraction fats are known in the art as cocoa butter extenders or substitutes. One example is found in U.S. Pat. No. 4,205,095 to Pike et al., issued May 27, 1980. Pike et al. describe a thermal fraction method for producing a palm mid-fraction which is then hydrogenated. Another such fat is disclosed in British Patent Specification No. 827,172 to Best et al., published Feb. 3, 1960, which relates to a method for making a cocoa butter substitute by a two-step solvent fractionation of palm oil.

The above references all relate to some treatment of the palm oil, such as fractionation, blending or co-randomization, in a effort to produce an acceptable palm-oil based margarine product.

Palm-oil based margarines possess two distinct groups of triglycerides which ultimately form different crystallization patterns. It is this difference in crystallization that is believed to account for the post-hardening phenomenon. Unfortunately, established processing techniques actually serve to enhance this inherent crystallization disadvantage because formation of homogeneous crystal types and size through processing techniques is not encouraged. Thus, relatively few references address processing changes to alleviate the problem.

In standard margarine manufacture, the aqueous phase ingredients (milk or milk solids, salt, flavors, preservatives and water) are dispersed in the oil phase (melted margarine fat, emulsifiers, color and flavors), and the mixture is then sent through a scraped wall heat exchanger known as an A unit. Besides chilling the emulsified fat, the high local pressure and shearing action of the A unit induces fast nucleation and crystallization of the triglycerides during the short residence time (0.5 to 60 seconds). The chilled emulsion is then sent to a crystallizer known as a B unit. Static B units, in the form of a hollow tube or resting tube, normally provide firm stick-type margarines. Working B units, in the form of picker boxes, serve to break up large crystals, producing smaller, purer triglyceride crystals. See Haighton, "Blending, Chilling, and Tempering of Margarines and Shortenings", *J. Am. Oil Chemists Soc.*, Vol. 53 (June, 1976), pp. 397-399; Wiedermann, "Margarine and Margarine Oil, Formulation and Control", *J. Am. Oil Chemists Soc.*, Vol. 55 (December, 1978), pp. 823-829.

U.S. Pat Nos. 4,217,372 and 4,087,565 to Ebskamp, issued Aug. 12, 1980 and May 2, 1978, respectively, disclose methods for improving the physical structure of fats in a margarine wherein the margarines are cooled, then mechanically worked and cooled again to a temperature lower than the first cooling. See also Chikany, "Crystallization Process of Fats and Their Role in Margarine Production. Part II", Olaj, Szappan, Kozmetika, 13: 9-13 (1982). However, even these margarines exhibit some deficiency.

Surprisingly, it has been found that a margarine that does not exhibit the post-hardening problem can be made from a margarine fat that contains fractionated palm oil and/or palm stearin. The fats used in this invention are characterized by a double-peaked differential scanning calorimetry curve representing two distinctly crystallizing triglyceride groups. Fats other than palm-based fats can be used, so long as they have this characteristic differential scanning calorimetry curve.

Furthermore, these fats are processed into emulsified spreads, such as margarines, by a method that results in uniform sizes of triglyceride crystals. The method involves cooling the emulsion; then working it; followed by a second cooling and a final working.

It is an object of the present invention, therefore, to provide emulsified spreads such as margarines having desirable mouth texture and thermal stability, with good spreadability due to the avoidance of post-hardening.

Another object of the present invention is to provide margarines and emulsified spreads made from fats containing two sets of triglycerides, one crystallizing at between about 77° F. (25° C.) and about 50° F. (10° C.), and a second group crystallizing at between about 41°

F. (5° C.) and about 14° F. (−10° C.). These fats have a characteristic double-peaked differential scanning calorimetry curve as represented in FIG. 1.

These and further objects will become apparent in the disclosure of the present invention described below. All percentages are by weight of total product unless indicated to the contrary.

SUMMARY OF THE INVENTION

The present invention relates to unique margarines and other water-in-oil emulsified spreads, based upon structural fats containing a triglyceride group crystallizing at a higher temperature range, about 77° F. (25° C.) to about 50° F. (10° C.), and a triglyceride group crystallizing at a lower temperature range, about 41° F. (5° C.) to about 14° F. (−10° C.).

The margarines and emulsified spreads of the present invention are processed by a method characterized as "freeze-pick-freeze-pick". This method involves (1) cooling a fat and water emulsion to a temperature below the nucleation point of the triglycerides crystallizing at the higher temperature range, (2) promoting crystal growth by working the margarine emulsion thereby causing these triglycerides to crystallize into uniform size crystals, (3) cooling the emulsion to a temperature below the nucleation point of the second group of triglycerides which crystallize at the lower temperature range, and (4) promoting uniform crystal growth by a second working step.

DEFINITIONS

Figure 1:
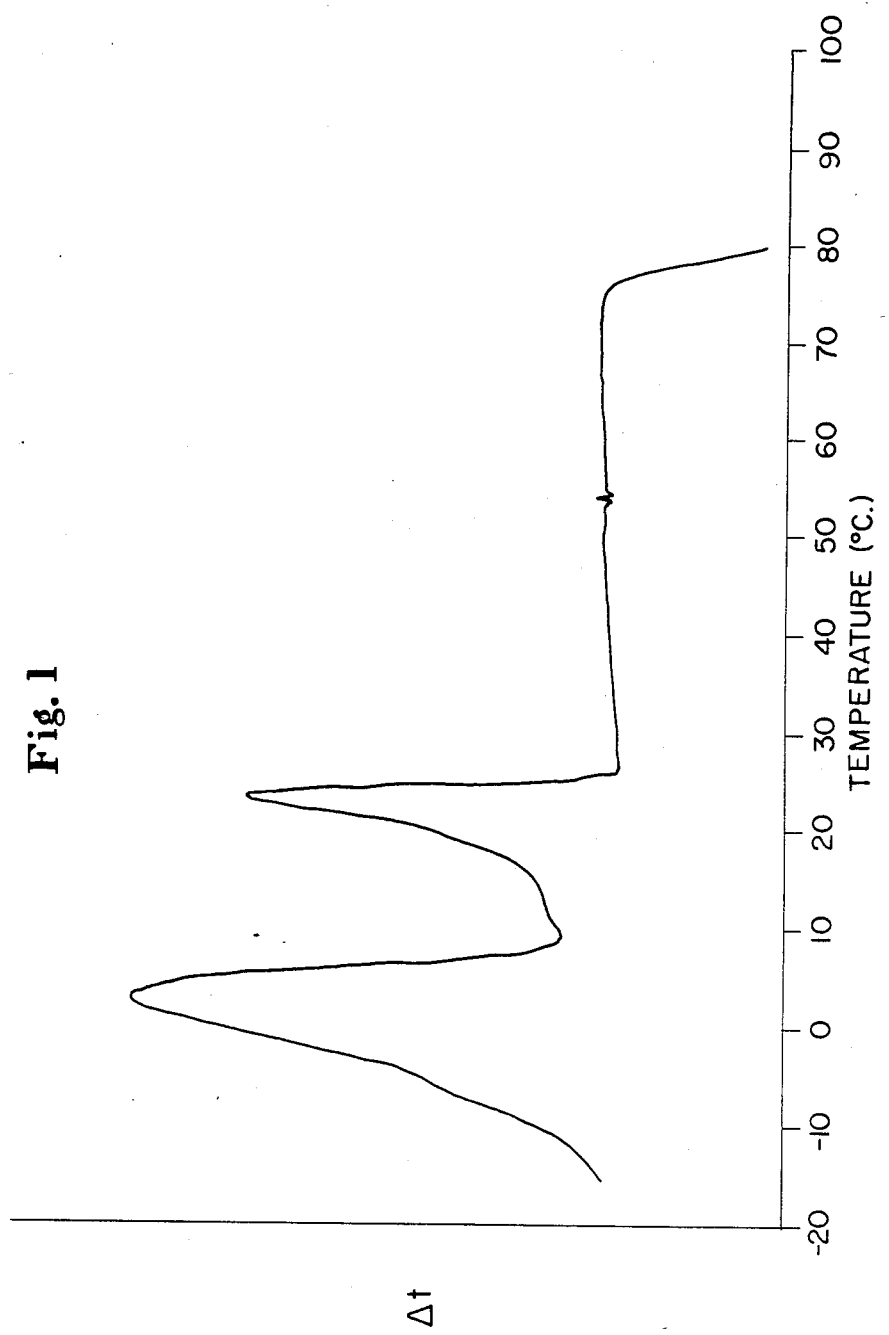
FIG. 1 represents a typical double-peaked differential scanning calorimetry cooling curve for the structural fat of this invention.

The term "emulsified spread" refers to a solid or plastic water-in-oil emulsion. Such spreads can contain from about 50% to about 90% margarine oil product and from about 10% to about 50% of an aqueous phase.

The term "margarine" refers to an emulsified spread characterized by an oil phase of at least about 80% by weight of the spread and an aqueous phase of about 20% by weight of the spread.

The term "soft oil" refers to a fat characterized by a Solid Fat Content of about 1% or less at 50° F. (10° C.) and 0% at 70° F. (21° C.).

The term "margarine fat" refers to the structural fat and soft oil blend used in the oil phase of an emulsified spread.

The term "structural fat" refers to a fat which is characterized by a double-peak in the differential scanning calorimeter. This fat is composed of triglycerides having a distinctive crystallization profile, one triglyceride group crystallizing at a high temperature range of about 77° F. (25° C.) to about 50° F. (10° C.) and one triglyceride group crystallizing at a lower temperature range of about 41° F. (5° C.) to about 14° F. (−10° C.).

A "double-peaked" differential scanning calorimetry (DSC) curve designates a structural fat having two distinct crystallization peaks, a triglyceride group crystallizing at from about 77° F. (25° C.) to about 50° F. (10° C.) and another triglyceride group crystallizing at from about 41° F. (5° C.) to about 14° F. (−10° C.).

"Nucleation" refers to the process whereby a minimum number of molecules come together to form a stable secondary phase; nucleation is the first step in the formation of a precipitate. Crystal growth is the second. One nuclei are formed, larger particles (crystals) are then formed.

"Freeze" refers to the process whereby an emulsion is chilled in any cooling device such as a scraped surface heat exchanger or an A unit in margarine processing.

"Pick" refers to a working of an emulsion as in a picker box or a B unit in margarine processing.

The desgnations "SSS, SOS, SLS, SSO and SOO" refer to trisaturated, symmetrical mono-unsaturated, symmetrical di-unsaturated, asymmetrical mono-unsaturated and asymmetrical di-unsaturated triglycerides, respectively.

The designation "$C_{48}$, $C_{50}$, $C_{52}$ and $C_{54}$" refer to the total number of carbon atoms of the combined fatty acid residues attached to the glyceride. Thus, "$C_{48}$" will yield three fatty acids having a combined total of 48 carbon atoms upon hydrolysis.

The designation of fatty acids throughout the specification are P=palmitic, St=stearic, O=oleic, L=linoleic, S=saturated fatty acid, U=unsaturated fatty acid, $C_{16}$ fatty acid is palmitic, and $C_{18}$ fatty acid is stearic. When S=$C_{16}$ or $C_{18}$, the triglyceride SSS can be tripalmitin, tristearin, 1,3-dipalmitylstearin, 1,2-dipalmitylstearin, 1,3-distearylpalmitin or 1,2-distearylpalmitin.

The terms "comprises" and "comprising" as used herein also include within their scope the more narrow terms "consisting essentially of" and "consisting of".

DETAILED DESCRIPTION OF THE INVENTION

The emulsified spreads and margarines of the present invention comprise from about 60% to about 90% by weight of an oil phase and from about 10% to about 40% by weight of an aqueous phase combined in a manner to produce 100% by weight of the composition. Preferably for margarines, at least 80% by weight oil phase is blended with up to 20% by weight aqueous phase. The oil phase of the compositions of the present invention comprises a blend of from about 30% to about 65% by weight soft oil, from about 35% to about 70% by weight structural fat, and other minor ingredients, combined in a manner to generate 100% by weight. For margarines, the oil phase preferably comprises from about 45% to about 60% soft oil, from about 40% to about 55% structural fat, and other minor ingredients combined to produce 100% by weight. The aqueous phase of the compositions of the present invention comprises milk or milk solids, flavorants, preservatives, and other minor suitable ingredients.

(A) COMPOSITION OF EMULSIFIED SPREADS AND MARGARINES

1. Oil phase a. Structural fat

The main component of the oil phase is the structural fat. This structural fat is comprised of fats or oils which are mixtures of triglycerides having two distinct crystallization ranges, as determined by differential scanning calorimetry (DSC). Levels of from about 35% to about 70% of this fat are used in combination with a soft oil to form the oil phase of the present invention.

DSC is a thermal analysis technique which quantitatively measures the differential heat flow (in millicalories per second) between a sample and a reference material, as a function of linearly programmed temperature (°C.) profile. In the present invention, the physical changes associated with crystallization cause a heat differential which is graphically recorded. With reference to FIG. 1, the structural fats suitable in the present invention each possess a double-peaked differential scanning calorimetry curve indicating a group of triglycerides crystallizing at from about 77° F. (25° C.) to about 50° F. (10° C.) and a second group of triglycerides crystallizing at from about 41° F. (5° C.) to about 14° F. (−10° C.).

The preferred fats of the present invention include a palm oil mid-fraction prepared by double thermal fractionation of palm oil. The triglyceride composition of this fat can be determined by several techniques. For instance, positional isomers can be determined by Argentation thin-layer chromatography (Argentation). The preferred structural fat comprises a mixture of the following combined in a manner to generate 100% by weight:

(a) from about 3% to about 9% by weight SSS triglycerides;
 (b) from about 32% to about 50% by weight SOS triglycerides;
 (c) from about 6% to about 12% by weight SSO triglycerides; and
 (d) from about 20% to about 32% by weight SOO/SLS triglycerides, wherein S=saturated $C_{16}$ or $C_{18}$ fatty acid residue, O=oleic acid residue, and L=linoleic acid residue. Additionally, Argentation indicates that up to about 24% by weight other compounds, mainly in the form of other positional isomer triglycerides (e.g. OOO, OOL, SLL, SLO) plus mono- and diglycerides, can be present.

Another parameter useful in defining the triglyceride composition of the preferred structural fat is the fatty acid composition (FAC), especially in terms of the P:St acid residues ratio and the O:L acid residues ratio. The FAC of the structural present fat comprises a mixture of the following combined in a manner to generate 100% by weight:

(a) from about 44% to about 55% by weight palmitic (P) acid residues;
 (b) from about 4.5% to about 5.5% by weight stearic (St) acid residues;
 (c) from about 31% to about 40% by weight oleic (O) acid residues;
 (d) from about 6% to about 9.5% by weight linoleic (L) acid residues; and
 (e) up to about 3% by weight of other fatty acid residues, such as myristic acid residues;

wherein said fat has a P:St ratio of about 8.5 or more, and an O:L ratio of about 3.5 more. Preferably, the P:St ratio will range from about 9 to about 10, and the O:L ratio will range from about 4 to about 5.

The carbon number profile (CNP) indicates the percentage of triglycerides having a certain number of carbon atoms for the combined fatty acid residues attached to the glyceride. The present fat has a CNP of:

(a) from about 5% to about 12% by weight $C_{48}$ triglycerides;
 (b) from about 40% to about 55% by weight $C_{50}$ triglycerides;
 (c) from about 23% to about 35% by weight $C_{52}$ triglycerides;
 (d) from about 5% to about 10% by weight $C_{54}$ triglycerides; and
 (e) about 12% by weight other compounds mainly in the form of mono- and diglycerides.

An important characteristic of the structural fat of the present invention is its melting profile. Melting profile is measured by the solids content of a fat at a particular temperature. This solid fat content value (SFC) provides a reasonable approximation of the percent by weight solids of a particular fat at a given temperature. The present structural fat is characterized by the following SFC values:

(a) from about 67% to about 80% at 50° F. (10° C.);
 (b) from about 31% to about 58% at 70° F. (21° C.);
 (c) from about 12% to about 39% at 80° F. (26.6° C.);
 (d) from about 4% to about 18% at 92° F. (33.3° C.); and
 (e) from about 7% or less at 105° F. (40.5° C.).

Other fats which have this characteristic crystallization profile and which are useful as the structural fat of the present invention include palm stearin.

b. Soft Oil

In addition of the structural fat described above, the oil phase of the present emulsified spreads also contains one or more soft oils at levels of from about 30% to about 65% by weight of the oil phase. Suitable soft oils have SFC values of:

(a) about 1% or less at 50° F. (10° C.); and
 (b) 0% at 70° F. (21° C.).

These oils can be derived from animal, vegetable or marine sources, including naturally occurring oils such as cottonseed oil, soybean oil, sunflower oil, corn oil, peanut oil, safflower oil, and mixtures thereof. Preferably, safflower oil, sunflower oil, soybean oil, and mixtures thereof are used, with soybean oil being most preferred.

The structural fat can also contain other fats such as sucrose polyesters of fatty acids. By "sucrose polyesters of fatty acids" or "SPE's" is meant esters of sucrose in which from 6 to 8 of the hydroxyl groups are esterified with fatty acids having from 10 to 20 carbons. The fatty acids can be saturated or unsaturated. The amount of these polyesters present will depend upon their solid fat content. One skilled in the art can easily recognize the SPE's which can be used.

Besides the structural fat and soft oil, the oil phase can include minor amounts of other fats and oils. Soft oils which have high solids content are included within the term "other fats and oils". Examples of such fats and oils include palm oil and interesterified oils or blends of various oils, either by random or directed interesterification. Examples of oils which can be interesterified, either alone or by apropriate blending, are palm oil, sunflower oil and safflower oil. Normally, these other oils are included at levels of from about 15% by weight or less, preferably at about 6% by weight or less.

From about 35% to about 70% of the structural fat is blended with about 30% to about 65% of the soft oil in order to form 100% by weight of the oil phase of the present invention. Varying the amount of the structural fat and soft oil affects the physical properties of the emulsified spreads. For instance, tub-type spreads typically have higher levels of soft oil while stick-type spreads have higher levels of structural fats. Therefore, by varying the level of the structural fat and soft oil, a variety of product forms may result.

c. Other Oil Phase Ingredients

Other ingredients which can be present in the oil phase include emulsifiers. Among the emulsifiers useful in the present invention are mono- and diglycerides, lecithin, and polyoxyethylene sorbitan monoesters such as TWEEN ® 60 and TWEEN ® 80, at levels of from about 0.01% to about 10% by weight of the spread, preferably from about 0.1% to about 0.5% by weight of the spread.

Coloring agents, such as beta-carotene, and oil soluble flavors are also added to the oil phase at levels desired and known by those skilled in the art. Antioxidants such as BHA (butylated hydroxy anisol) and BHT (butylated hydroxy toluene) can also be added to the oil phase.

2. Aqueous Phase Ingredients

Milk or milk solids usually constitutes the major ingredient of the aqueous phase. This milk component can be derived from whole milk, low-fat milk (2% butterfat content), skim milk, or nonfat dry milk solids. The level of milk and/or milk solids usually ranges from about 0.5% to about 5% by weight of the margarine or emulsified spread, preferably from about 1% to about 3% by weight. If milk solids are used, distilled or deionized water is included. For a non-browning spread, the milk solids or reducing sugars in the milk solids are eliminated.

Other aqueous phase ingredients include flavorants such as salt and other water-soluble flavors. Salt, from about 0.5% to about 3.5% by weight, preferably from about 1% to about 2.5% by weight, is used.

Preservatives are also included in the aqueous phase. Among suitable preservatives are included citric acid, potassium sorbate, sodium benzoate, and mixtures thereof in amounts effective to prevent oxidation, bacterial and mold growth.

(B) METHOD FOR MAKING EMULSIFIED SPREADS AND MARGARINES

Figure 2:
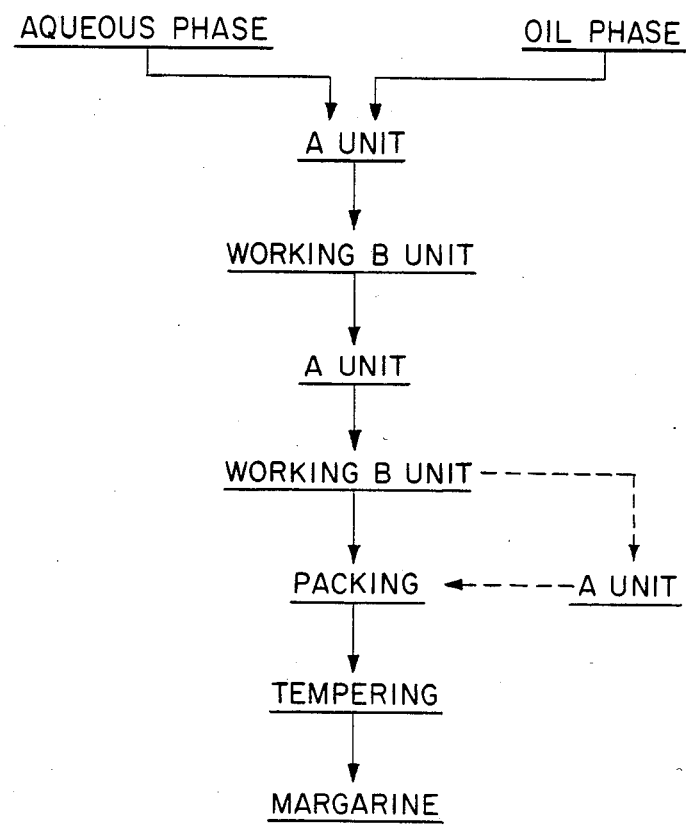
FIG. 2 represents a flow diagram of the method for making margarines and other emulsified spreads of the present invention.

The method for making the margarines and other emulsified spreads in accordance with the present invention is shown in flow diagram labelled FIG. 2. This method involves blending from about 30% to about 65% by weight of the soft oil with about 35% to about 70% by weight of the melted structural fat in a manner to form 100% by weight of the oil phase. Preferably, from about 45% to about 60% of the soft oil is combined with from about 40% to about 55% of the structural fat in order to form the oil phase of a margarine. This is usually done at temperatures above 110° F. (43° C.), preferably at temperatures of 120° F. (49° C.) to 140° F. (60° C.). This oil phase, which is completely melted, then is blended with the aqueous phase ingredients. From about 60% to about 90% of the oil phase is blended with from about 10% to about 40% aqueous phase in a manner to form 100% by weight of the emulsified spread or margarine. For margarines, preferably at least 80% oil phase is blended with up to 20% aqueous phase.

This emulsion is then chilled to a temperature of from about 77° F. (25° C.) to about 45° F. (7° C.), preferably from about 60° F. (15° C.) to about 45° F. (7° C.), most preferably from about 55° F. (13° C.) to about 50° F. (10° C.). This temperature range corresponds to a temperature at or below the nucleation point of the triglycerides represented by the first DSC peak. Such cooling can be carried out in a scraped surface heat exchanger, such as the Votator unit manufactured by Chemtron, Inc. (unit A in FIG. 2). This A unit consists of a steel shaft rotating in a tube. This tube is cooled externally by liquid ammonia, brine or other refrigerants. The rotator shaft is fitted with scraper blades which press against the cooled inner surface at high rotation speeds. The high internal pressures and chilling action induce nucleation and crystallization of the emulsion.

Unit A is usually set at a rotator speed of from about 100 to about 2000 rpm. The emulsion is discharged from unit A at a temperature of from about 65° F. (18° C.) to about 45° F. (7° C.). Total residence time within unit A is at least 0.5 minutes, preferably ranging from about 0.5 minutes to about 2 minutes.

Other cooling devices such as shell and tube exchangers or thin-walled heat exchangers can be used, if desired.

Next, the emulsion is crystallized in unit B, preferably a picker box. A picker box typically consists of a large diameter tube having stator pins in the inner cylinder wall and a rotating shaft fitted with rotor pins. The combination of stator and rotor pins mechanically work the fat as it passes through the unit. The rotor rotates at speeds of from about 50 to about 1000 rpm. The picker box promotes triglyceride crystal growth within the emulsion while working the emulsion to form uniform crystal sizes. During the process, the heat of crystallization and the work added usually cause a temperature increase. This working period requires from about 0.1 to about 1 hour working, preferably 0.2 hours to 0.4 hours.

The emulsion is then cooled again in an A unit. Cooling is carried out at about the crystallization temperature range of the second peak, at about 41° F. (5° C.) to about 14° F. ($-10°$ C.), preferably at about 35° F. (2° C.) to about 14° F. ($-10°$ C.). The rotator speed of this second cooling is set at a speed of from about 100 to about 1000 rpm. And the total residence time in unit A for the second cooling is 0.2 to 2 minutes, preferably 0.2 to 1 minute.

Following the second cooling, the emulsion is again worked, usually in a picker box, to promote additional crystal growth of the second, lower temperature range crystallizing triglyceride group. Residence time in the second picker box ranges from about 1 minute to about 10 minutes with a rotor speed of 50 to 1000 rpm. This second working is believed to be responsible for attaining a uniform triglyceride crystal size for the secondary triglyceride group.

After crystallization of both triglyceride groups, the emulsified spread is packed in either tub or stick form. For stick-type products, the emulsified spread, margarines in particular, either can be extruded or molded into bars via techniques known to those in the art. A packed margarine is usually tempered at a temperature of from about 30° F. ($-1°$ C.) to about 50° F. (10° C.) for at least about 24 hours.

(C) POST HARDENING

Although the Applicant does not want to be limited by theory, it is believed that the alleviation of the post-hardening phenomena in the emulsified spreads and margarines of the present invention is a result of separate crystallization of two distinct triglyercide crystal groups, beta (B) and beta-prime (B'). It is believed that this mixture of pure B and B' crystals, rather than a mixture containing B and B'-tending triglycerides, provides the present spreadable products.

Conventional margarine processing of the structural fats of this invention results in the occurrence of post-hardening in the product generated. With only a single cooling step, the temperaure is usually low enough to crystallize all the triglycerides present, resulting in rapid nucleation and crystallization of all the triglycerides on the initial nuclei. This will result in individual crystals containing both B and B'-type crystals. Post-hardening over time occurs due to the propensity of the specific triglyceride species to exist in a pure crystalline form. Thus, there is a realignment of crystals in the product causing crystal interlock and post-hardening will occur.

Alternatively, with only a single cooling step, the temperature can be at a range at which only the higher temperature crystallizing triglycerides solidify. This results in a product with insufficient solids to form a margarine stick. If sufficient solids are used to alleviate this molding problem, then upon refrigeration of the product at temperatures which would cause the second set of triglycerides to crystallize, post-hardening again will take place.

In the present invention, however, the first cooling crystallizes only B crystals. When using fractionated palm oil or palm stearin, slow crystallizing materials, a relatively long picking time is required to get complete crystallization. Then, a second freezing occurs that sufficiently lowers the temperature to crystallize out the B' crystals. Picking time required here is shorter than the first since this is a faster crystallization. However, if this second picking step is eliminated, complete crystallization of the second triglyceride species will not occur.

Once the "freeze-pick-freeze-pick" process is completed, all the crystalline fat will be in its pure crystallized forms, reducing post-hardening over time. Both temperature and the amount of work applied to the emulsion are important in this process. If the crsytallization time is not sufficient to crystallize substantially all of the triglycerides, crystallization will continue after the working step. The working steps are necessary to complete the separate crystallization processes of both the B and B'-type crystals.

The emulsified spreads and margarines processed according to the present process exhibit improved spreadability. There are characterized by a shear stress value of from about 3 to about 10. This shear stress is maintained over a period of 6 months indicating a reduction of post-hardening which is usually encountered with such products.

METHODS FOR MEASURING PROPERTIES OF OILS USED IN EMULSIFIED SPREADS AND MARGARINE PRODUCTS

(A) Differential Scanning Calorimetry

Differential Scanning Calorimetry (DSC) is a method which measures temperature differences (heat differential via electrical input) between a sample and a reference material over a continuously programmed temperature change. As with other differential thermal analyses, DSC measures every chemical reaction or physical change which liberates or absorbs heat. It is this heat differential that is recorded.

DSC was carried out in a duPont Model 990 thermal analyzer connected to a Model 910 differential scanning calorimeter. A cooling rate of 5° C./minute was used and a sensitivity of 0.5 millicalories per inch was maintained. Ten ±0.5 mg. samples, a reference and the fat, were placed in the sample aluminum cups and positioned in the center of an encapsulated cell. There was no sample material on the lip of these encapsulated cells.

The sample cell and the empty reference cell were then placed on a Constantan disc. This is a raised platform. Heat then was transferred through the disc into the sample and reference chamber. The differential heat flow to the sample and reference is monitored by a Chromel/Constantan area thermocouple formed by the junction of the Constantan disc and the Chromel wafer. This Chromel wafer covers the underside of each platform. Chromel and Alumel wires are connected to the underside of the Chromel wafers, with the resultant Chromel/Alumel thermocouple used to directly monitor the sample temperature.

Since the melting behavior of a substance is very much dependent on that substance's inherent structural properties, DSC is a useful tool in identifying similarly-structured substances. The present two-peaked structural fats represent those substances having distinctly crystallizing triglyceride groups which result in heterogeneous crystallization.

(B) Spreadability

Figure 3:
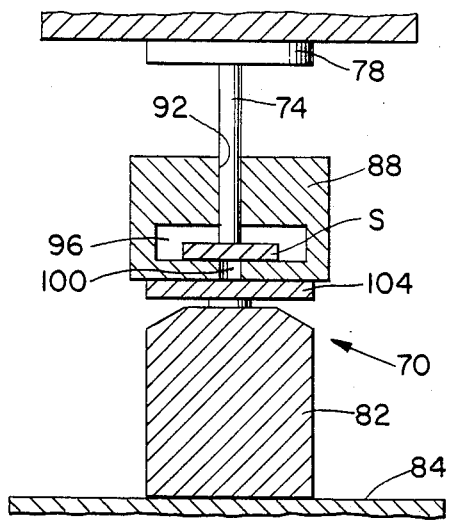
FIG. 3 represents a sectional side view of the instron and related apparatus to measure shear stress.

Shear Stress (SS) is a method of measuring the hardness of a margarine product. The SS test utilizes an Instron Universal Testing Machine (Model No. TMS), shown in FIG. 3 as 70. Instron 70 has a vertically movable cross head 78 and a 200 lb. compression load cell 82 (measuring force generated) mounted on a base 84. Cross head 78 drives unconnected cylindrical punch 74 which is received by rectangular fixture 88. This fixture 88 has a cylindrical bore in the form of a punch guide 92 for sliding of punch 74. A test chanber 96 is formed in fixture 88 for receiving the sample pad S to be tested. Fixture 88 also has a cylindrical bore in the form of die 100 over which sample S sits. The entire fixture 88 sits on load plate 104 of load cell 82.

The downward movement of crosshead 78 pushes punch 74 against sample pad S. Pad S is put under shear jointly by the action of the tip of punch 74, and die 100 of fixture 88. Load cell 82 measures the force required to punch through pad S and records it as a force curve on chart paper. The Shear Stress value of pad S is then calculated from this force curve.

Sample pads from a margarine are $\frac{1}{4}$ inch thick by $1\frac{1}{4}$ inch square, if from a stick-type product. These pads are equilibrated at 40° F. (4° C.) by submergence in a constant temperature waterbath for at least an hour. Tub-type products are removed and cut into sticks having $1\frac{1}{4}$ inch cross sections. Then, they are cut into squares $\frac{1}{4}$ inch thick.

The sample pad S is placed in test chamber 96 of fixture 88. Fixture 88 is then placed on load plate 104 of load cell 82 and the load cell is then tared. The Instron is then calibrated by placing a known weight on load plate 104 of load cell 82 along with fixture 88 and pad S. The SS test is initiated by bringing cross head 78 into its downward motion which pushes punch 74 through sample pad S. The chart paper of the recorder moves in concert with cross head 78 with recordation of SS.

The force (F) values for four samples are averaged according to the above-described method, and shear stress value, $S_S$, is calculated by the following formula:

$$S_S = F/(DT)$$

wherein D = diameter of punch 74 and T = thickness of the sample pad. D and T are constant, therefore providing the following $S_S$ at 40° F. (4° C.):

$$S_S = 2.55F$$

Figure 4:
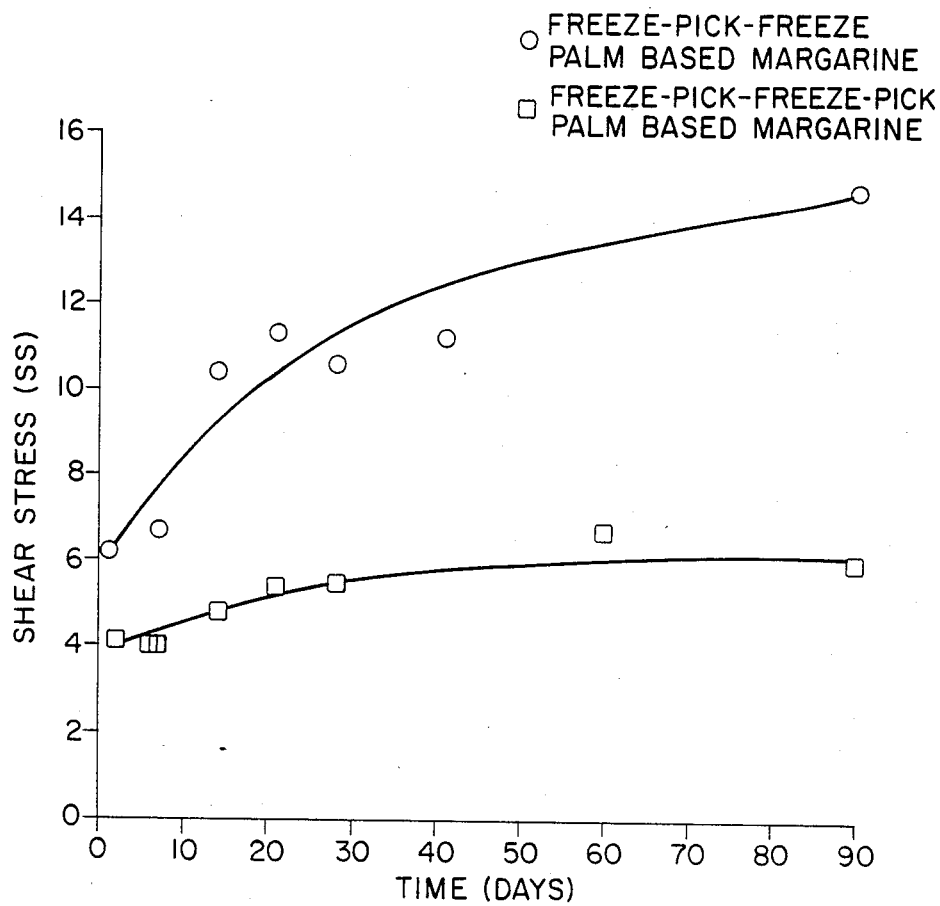
FIG. 4 represents two curves. One is a typical shear stress versus time curve for a product made by a method that did not involve two working steps, and the second represents a typical shear stress versus time curve for a product made in accordance with the present invention which utilizes two working steps.

FIG. 4 presents a typical SS versus time curve for a product made without the last working or "pick" step and one made by the process of this invention.

As is evident from the top curve in FIG. 4, that margarine product made without the second working step had an initial SS of about 6.2. However, over time, this SS increased to about 11 at 25 to 30 days and reached 14.6 at 90 days. SS values over 10 indicate unacceptable products.

On the other hand, the bottom curve of FIG. 4 presents a typical SS versus time curve for a margarine product made in accordance with the present process. Initially, the product had an SS of about 4.1. With time, this increased to only about 5.5 at 25 to 30 days. Even more significant is the fact that the SS of a product made in accordance with the present invention reached an SS value of only 6 at 90 days.

The following examples are specific embodiments of the product of the present invention and method for its preparation, but are not intended to limit it.

EXAMPLE I

A stable nonpost-hardening spreadable stick margarine was made from the following formula:

| | Weight % |
|---|---|
| Oil Phase | |
| Thermally fractionated palm mid-cut | 55.000 |
| Soybean oil - refined, bleached, deodorized | 24.700 |
| Emulsifier (mono- and diglycerides) | 0.100 |
| Lecithin | 0.100 |
| 24% beta carotene | 0.004 |
| Vitamin A palmitate | 0.003 |
| Aqueous Phase | |
| Sweet cream buttermilk concentrate | 0.940 |
| De-ionized water | 14.410 |
| Non-fat milk solids | 2.000 |
| Non-iodized salt | 1.750 |
| Citric acid | 0.004 |
| Potassium sorbate | 0.010 |
| Butter flavor | 0.979 |

The soybean oil and the thermally fractionated palm oil were blended. The other remaining oil phase ingredients were added to this blend and heated in a jacketed tank to 120° F. (49° C.). The potassium sorbate, citric acid, and non-fat dry milk solids were added to the water. The sweet cream buttermilk concentrate and salt were then added to the aqueous phase and mixed at a temperature of 120° F. (49° C.). The aqueous phase was then added to the oil phase in the tank, and the total mixture was maintained at a temperature of 120° F. (49° C.).

A stick margarine was produced from this emulsion in the following manner: The product was metered from the jacketed tank using a metering pump set at a flow rate of 100 lbs/hour. This emulsion was passed through two scraped surface heat exchangers (Votators) for a residence time of approximately 0.75 minute each. The product temperature was reduced from 120° F. (49° C.) to approximately 50° F. (10° C.) when passed through the first scraped surface heat exchanger. That temperature was maintained through the second scraped surface heat exchanger to allow for an adequate period of crystallization to occur.

The product was then pumped into a picker box set at 100 rpm for a residence time of 13 minutes. The temperature of the product when exiting the picker box was approximately 60° F. (16° C.). The product was then passed into a third scraped surface heat exchanger where its temperature was reduced from 60° F. (16° C.) to 32° F. (0° C.). Residence time in this exchanger totalled about 0.75 minute. The resulting emulsion was then pumped into another picker box for a residence time of 1 minute at a shaft speed of approximately 100 rpm.

The product was formed into a stick margarine by using a square tube approximately 5 feet in length. Passage through the square-sided tube permitted the margarine to set for a stick-type product. The shear stress of the final product was approximately 6 shear stress units.

EXAMPLE II

Example II was made with the following ingredients:

| | Weight % |
|---|---|
| Oil Phase | |
| Palm oil with a iodine-value of 45.8 | 48.000 |
| Soybean oil - refined, bleached, deodorized | 31.900 |
| Emulsifier (mono- and diglycerides and lecithin) | 0.200 |
| 24% beta carotene | 0.004 |
| Vitamin A palmitate | 0.003 |
| Aqueous Phase | |
| De-ionized water | 10.410 |
| Non-fat dry milk solids | 6.940 |
| Salt | 1.750 |
| Citric acid | 0.004 |
| Potassium sorbate | 0.010 |
| Butter flavors | 0.779 |

A margarine blend was prepared by heating the palm and soybean oils to 125° F. (52° C.). The remaining minor oil-soluble ingredients were then added to the oils.

The aqueous phase was prepared by dissolving the non-fat dry milk solids in distilled water, followed by the addition with mixing of the other aqueous phase ingredients. The aqueous phase was then added to the oil phase, and the temperature of this emulsion was maintained at approximately 120° F. (49° C.). The product was pumped through a pair of scraped surface heat exchangers manufactured by the Votator Corporation. The flow rate was approximately 107 lbs./hr., and the residence time in the two scraped surface heat exchangers was combined to a total of 1.5 minutes. The Votator shafts were turning at approximately 1500 rpm. The exit temperature of the product was 50° F. (10° C.).

This product was then pumped through a picker box having a shaft speed of approximately 100 rpm, with residence time of 13 minutes. The exit temperature from the picker box was approximately 60° F. (16° C.).

The product was then run through a third scraped surface heat exchanger with a residence time of approximately 0.75 minute. Shaft speed was approximately 800 rpm. The second "picking" took place in a picker box, residence time of approximately 3.6 minutes and a flow rate of 107 lbs./hr. The shaft speed was approximately 100 rpm. The temperature of this final product was 38° F. (3° C.).

To allow for rapid formation of the product in stick form, the temperature of the product was then reduced to approximately 32°–35° F. (0° C. to 2° C.) by using a fourth scraped surface heat exchanger. The product was then formed into ¼-pound sticks of margarine using a forming unit. These sticks were then wrapped. The initial shear stress of the product was approximately 3.5 shear units, with a shear stress of 6.5 units after 9 weeks aging.

EXAMPLE III

A product is made as in Example I, except that the final working step is eliminated.

The oil and aqueous emulsion is chilled to a temperature of 40° F. (4.4° C.). This product is pumped through a picker box for about 13 minutes. The setting on the picker box is 100 rpm. Then, the resultant emulsion is run through another freezing step at temperature of 30° F. (−1.0° C.).

The product was formed into ¼-pound sticks of margarine using a forming unit and wrapped. Shear stress measurements were performed at periodic time intervals up to 90 days. The results are shown graphically in FIG. 4.

The product of the present invention was made according to Example I using the freeze-pick-freeze-pick method. It was formed into ¼-pound sticks and wrapped. Shear stress measurements were performed periodically up to 90 days. The results are shown graphically in FIG. 4. Product prepared without the final working step had a shear stress of 14.6 at 90 days, while that prepared using the process of the present invention had a shear stress of about 6 at 90 days indicating a lack of post-hardening.

What is claimed is:

1. A method for making an emulsified spread comprising the steps of:
    (a) forming an emulsion of from about 60% to about 90% of a melted oil phase and from about 10% to about 40% of an aqueous phase, wherein said oil phase comprises from about 35% to about 70% of a structural fat comprising a mixture of triglycerides, one crystallizing at about 77° F. (25° C.) to about 50° F. (10° C.) and the second crystallizing at about 41° F. (5° C.) to about 14° F. (−10° C.), and from about 30% to about 65% of a soft oil;
    (b) cooling said emulsion to a temperature between from about 77° F. (25° C.) to about 45° F. (7° C.) for at least 0.5 minutes;
    (c) working the cooled emulsion of step (b) for from about 0.1 hour to about 1 hour;
    (d) cooling the worked emulsion of step (c) to a temperature of between from about 14° F. (−10° C.) to about 41° F. (5° C.) for from 0.2 to about 2 minutes; and
    (e) working the cooled emulsion of step (d) for from about 1 to about 10 minutes.

2. A method according to claim 1, wherein said emulsion of step (b) is cooled to a temperature of from about 60° F. (15° C.) to about 45° F. (7° C.).

3. A method according to claim 2, wherein said emulsion of step (b) is cooled for from about 0.5 to about 2.0 minutes.

4. A method according to claim 3, wherein said emulsion of step (d) is cooled to a temperature of from about 35° F. (2° C.) to about 14° F. (−10° C.).

5. A method for making an emulsified spread according to claim 1, said emulsified spread being a margarine comprising:
    (a) at least about 80% by weight of said oil phase; and
    (b) up to about 20% by weight of said aqueous phase.

6. A method for making a margarine according to claim 5, wherein said structural fat comprises a mixture of the following to generate 100% by weight:
    (a) from about 3% to about 9% by weight SSS triglycerides;
    from about 32% to about 50% by weight SOS triglycerides;
    from about 6% to about 12% by weight SSO triglycerides;
    from about 20% to about 32% by weight SOO/SLS triglycerides;
    up to 24% other glycerides, mainly other positional isomer triglycerides and mono- and diglycerides;
    wherein S=saturated $C_{16}$ or $C_{18}$ fatty acid residue, O=oleic acid residue, and L=linoleic acid residue; and
    (b) said fat of (a) having a weight ratio of a P:St acid residues attached to the glycerides of about 8.5 or more and a weight ratio of O:L acid residues of about 3.5 or more, wherein P=palmitic, St=stearic, O=oleic, and L=linoleic.

7. A method for making a margarine according to claim 6, wherein said structural fat has a solid fat content comprising:
    from about 67% to about 80% at 50° F. (10° C.);
    from about 31% to about 58% at 70° F. (21° C.);
    from about 12% to about 39% at 80° F. (26.6° C.);
    from about 4% to about 18% at 92° F. (33.3° C.); and
    less than about 7% at 105° F. (40.5° C.).

8. A method for making a margarine according to claim 7, wherein said structural fat has a fatty acid composition comprising a mixture of the following to generate 100% by weight:
    from about 44% to about 55% by weight palmitic acid residues;
    from about 4.5% to about 5.5% by weight stearic acid residues;
    from about 31% to about 40% by weight oleic acid residues;
    from about 6% to about 9.5% by weight linoleic acid residues; and
    up to about 3% of other fatty acid residues.

9. A method for making a margarine according to claim 8, wherein said structural fat has a carbon number profile comprising:
    from about 5% to about 12% by weight $C_{48}$ triglycerides;
    from about 40% to about 55% by weight $C_{50}$ triglycerides;
    from about 23% to about 35% by weight $C_{52}$ triglycerides;
    from about 5% to about 10% by weight $C_{54}$ triglycerides;
    and up to 12% other glycerides, mainly mono- and di-glycerides.

10. A method for making a margarine according to claim 9, wherein said weight ratio of P:St acid residues attached to the glycerides is from about 9 to about 10, and said weight ratio of O:L acid residues attached to the glycerides is from about 4 to about 5.

11. A method for making a margarine according to claim 6, wherein said soft oil has a solid fat content of:
(a) about 1% or less at 50° F. (10° C.); and
(b) 0% at 70° F. (21° C.).

12. A method for making a margarine according to claim 11, wherein said soft oil is selected from the group consisting of soybean oil, safflower oil, sunflower oil, and mixtures thereof.

13. A method for making a margarine according to claim 12, wherein said soft oil is soybean oil.

14. A method for making a margarine according to claim 13, wherein said structural fat is derived from palm oil.

15. A method for making a margarine according to claim 11, wherein said emulsion in step (b) is cooled to a temperature of from about 60° F. (15° C.) to about 45° F. (7° C.).

16. A method for making a margarine according to claim 15, wherein the emulsion is cooled for from about 0.5 to about 2.0 minutes.

17. A method for making a margarine according to claim 16, wherein the emulsion of step (d) is cooled to a temperature of from about 35° F. (2° C.) to about 14° F. (−10° C.).

18. A method for making a margarine according to claim 11, wherein said margarine additionally is comprised of an emulsifier selected from the group consisting of monoglycerides, diglycerides, lecithin, polyoxyethylene sorbitan monoesters, and mixtures thereof.

19. An emulsified spread made according to claim 1, wherein said spread has a shear stress of from about 3 to about 10.

20. An emulsified spread made according to claim 5, wherein said spread has a shear stress of from about 3 to about 10.

21. A margarine made according to claim 6, wherein said margarine has a shear stress of from about 3 to about 10.

22. A margarine made according to claim 11, wherein said margarine has a shear stress of from about 3 to about 10.

23. A margarine made according to claim 18, wherein said margarine has a shear stress of from about 3 to about 10.

* * * * *